March 19, 1940. H. KÜPPENBENDER 2,194,284
STEREOSCOPIC CAMERA
Filed Sept. 15, 1938 4 Sheets-Sheet 1

Inventor.
Heinz Kuppenbender
BY
Attys.

March 19, 1940.     H. KÜPPENBENDER     2,194,284
STEREOSCOPIC CAMERA
Filed Sept. 15, 1938     4 Sheets-Sheet 4

Inventor:
Heinz Küppenbender
BY B. Singer & F. Stern
Attys

Patented Mar. 19, 1940

2,194,284

UNITED STATES PATENT OFFICE 2,194,284

STEREOSCOPIC CAMERA

Heinz Küppenbender, Dresden, Germany, assignor to Zeiss Ikon Aktiengesellschaft, Dresden, Germany Application September 15, 1938, Serial No. 230,038
In Germany December 31, 1936

18 Claims. (Cl. 95—56)

This invention relates to improvements in stereoscopic cameras.

It is an object of the present invention to render the speed of the shutters for the two objectives with which the camera is equipped uniform to a higher degree than it had been feasible heretofore.

Another object of the invention is to simplify the actuation of the two shutters while retaining a strictly simultaneous operation of both of them.

It is, furthermore, an object of the invention to facilitate the tensioning of the shutter mechanism through which both of the shutters for the camera are operated.

Another object of the invention is to combine the operation of tensioning the shutter with the operation of advancing the carrier of the sensitized emulsion from one position to the next exposure position so as to make it impossible to produce successive exposures upon the same area of the carrier.

It is another object of the invention to mount the manipulating element for setting the speed of the shutter in a readily accessible and observable position on the camera and to mount on the same part of the camera also that manipulating member through which the shutter is tripped to effect the exposure at that speed at which the shutter had previously been set.

With these and numerous other objects in view, an embodiment of the stereoscopic camera forming the subject matter of the present application is illustrated in the accompanying drawings to which reference is made in the following specification.

Figure 1:
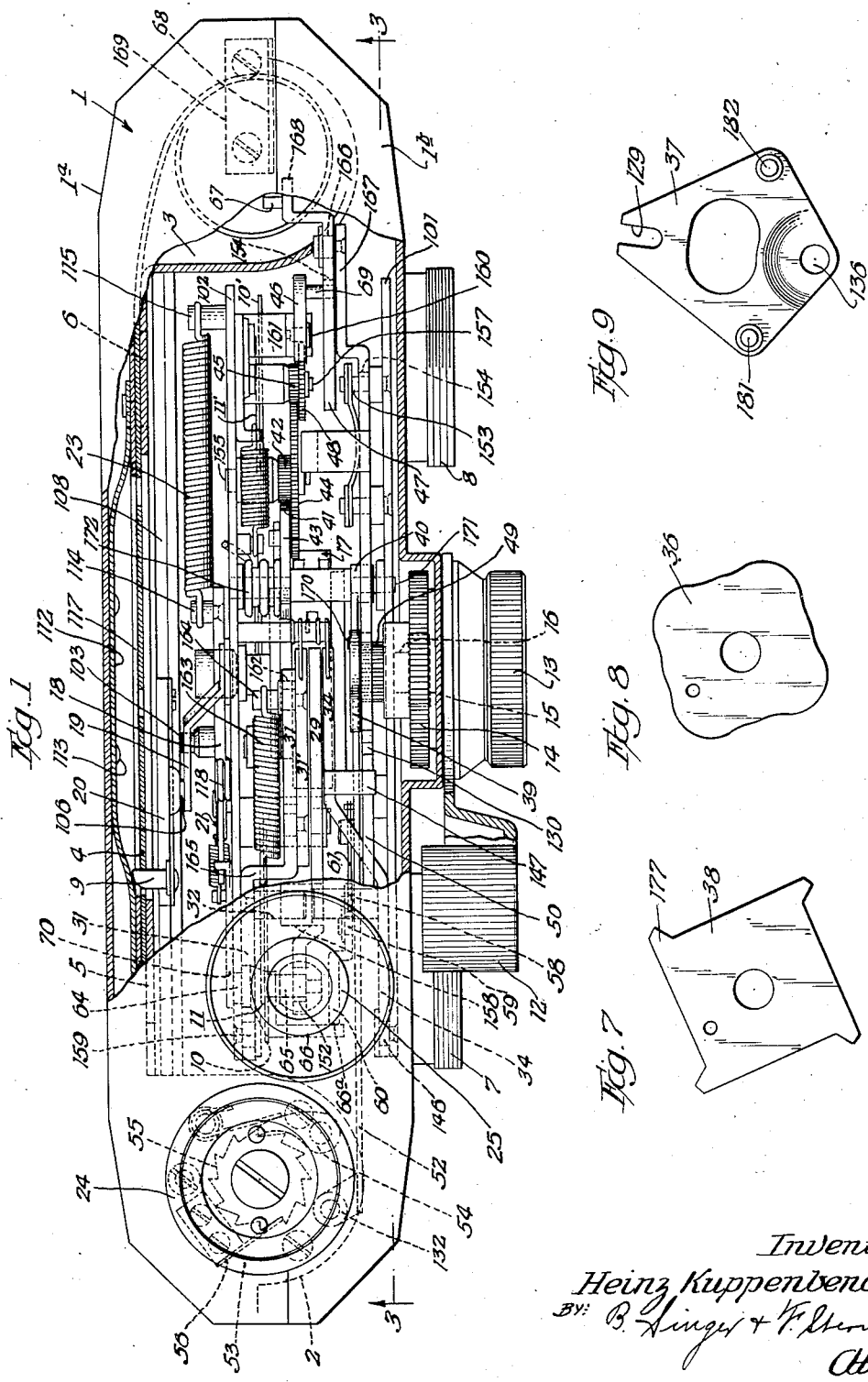
Fig. 1 is a horizontal sectional view through the apparatus.

Figs. 6 to 9 inclusive are detail views.

The casing 1 of the camera is assembled, in the embodiment illustrated, of a rear section 1a and a front section 1b which may be held in assembled relation by any suitable means, not illustrated. The rear section 1a advisably contains a false rear wall portion which extends parallel to the rear wall proper of the section and forms a guideway for the film 4, the false rear wall having lateral extensions projecting towards the forward section. The extensions are curved, as indicated, to constitute chambers 2 and 3 for the reception of the film spool, not shown, and for the reception of the film 4, respectively, which winds itself up within the chamber 3 without requiring any take-up spool. The false rear wall also is provided with openings 5 and 6 of approximately the size and shape of a picture to be produced. The camera is primarily intended to use a film with marginal perforations as employed in portable motion picture cameras and having a width of about 16 millimeters. It is obvious, however, that the entire apparatus also may be used for films of different dimensions.

The front section 1b of the camera is equipped with lens mountings 7 and 8 respectively, laterally spaced from each other a distance corresponding approximately to the spacing between the human eyes. These lens mountings and the lenses, not shown, supported therein are in alinement with the openings 5, 6 in the false rear wall of the camera.

This wall is provided with a guideway for the film feed. The film 4 is pressed against the wall by a pressure plate 111 urged against the film by a bow spring 112 which is riveted at 113 to the wall of the casing.

For advancing the film to make successive exposures, the front wall of the casing carries rotatably mounted thereon near its upper part a manipulating lever 12. This lever which is pivotally supported on the casing is connected in the interior of the casing with a relatively large spur gear 14 in engagement with a pinion 15 fixedly secured on a shaft 16 which extends transversely through the casing from the front towards the rear.

Figure 4:
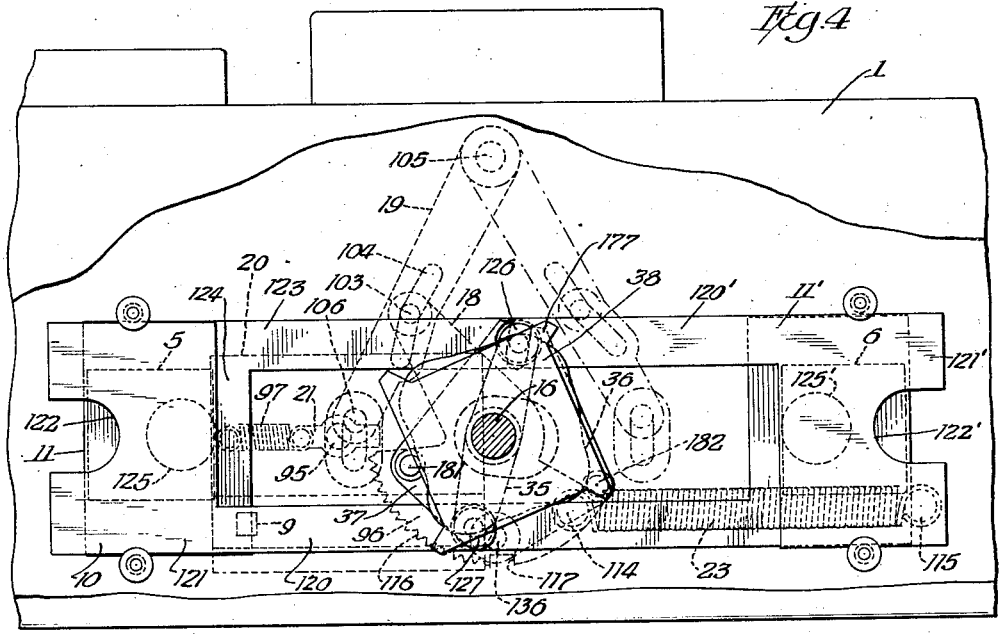
Fig. 4 is a detail elevation and partly section of the shutter assembly and actuating elements.

The main mechanism in the interior of the casing is assembled between two frame plates 101 and 102, which are held in proper spaced parallel relation by spacing posts, not illustrated, and which also are secured relatively to the casing in some suitable manner. The shaft 16 rotatably extending through both of said plates has fixed thereon at the end projecting from the rear plate 102 a crank arm 18 (Fig. 4). This arm is provided at its free end with a pin 103 projecting into a cam slot 104 of a lever 19 which is advisably pivoted at 105 to the rear plate 102 substantially in vertical alinement with the axes of rotation of the manipulating lever 12 and shaft 16. It is obvious, therefore, that upon rotation of the shaft 16, and crank arm 18 connected therewith, a rocking movement is imparted to the lever 19 about its pivotal support 105.

The lever 19 carries at its lower free end a pin 106 (Fig. 5) which enters a vertical slot 107 in a slide plate 20 by means of which the feeding movement of the film is produced. The slide plate 20 is guided for rectilinear movement in a plane parallel to the rear wall of the casing in guideways 108, 109, the extent of rocking movement of lever 19 and hence of the film feed being indicated in dotted lines in Fig. 4.

Figure 2:
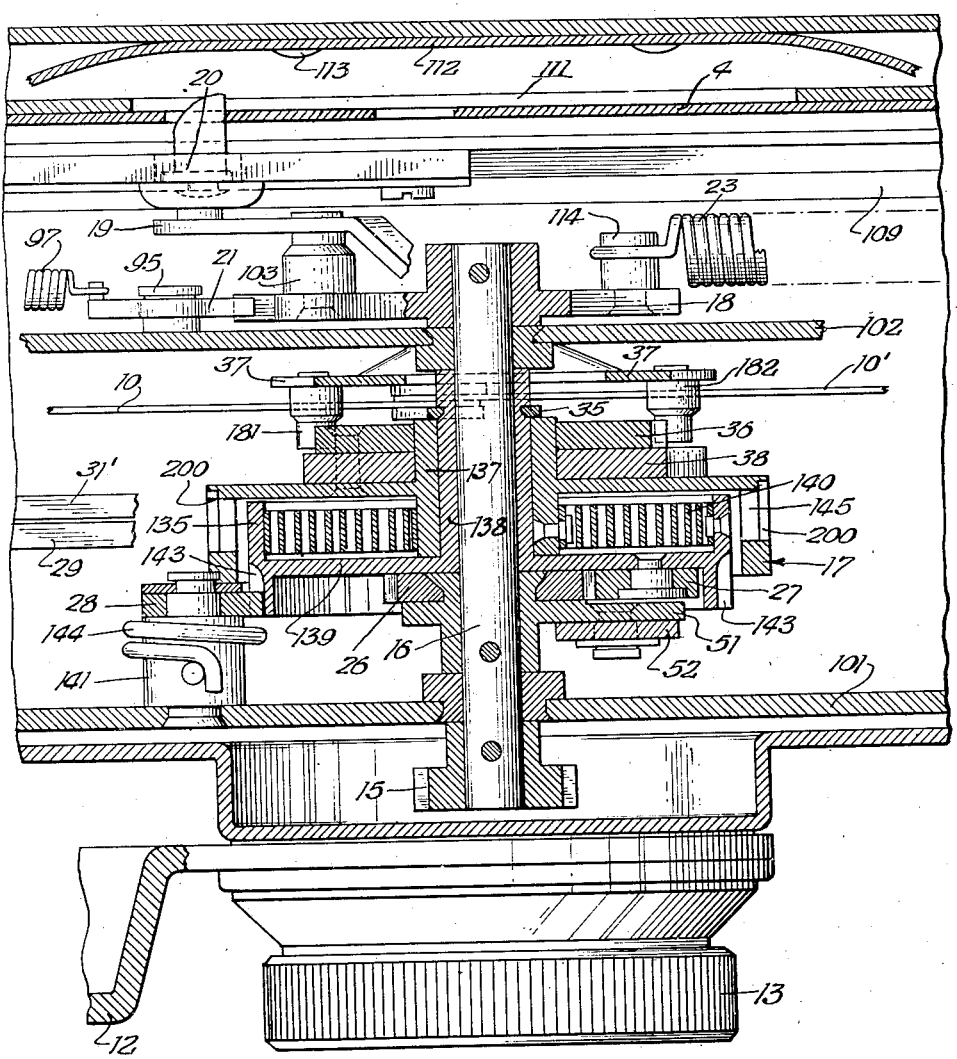
Fig. 2 is a horizontal sectional view in another plane through the spring motor.
Figure 5:
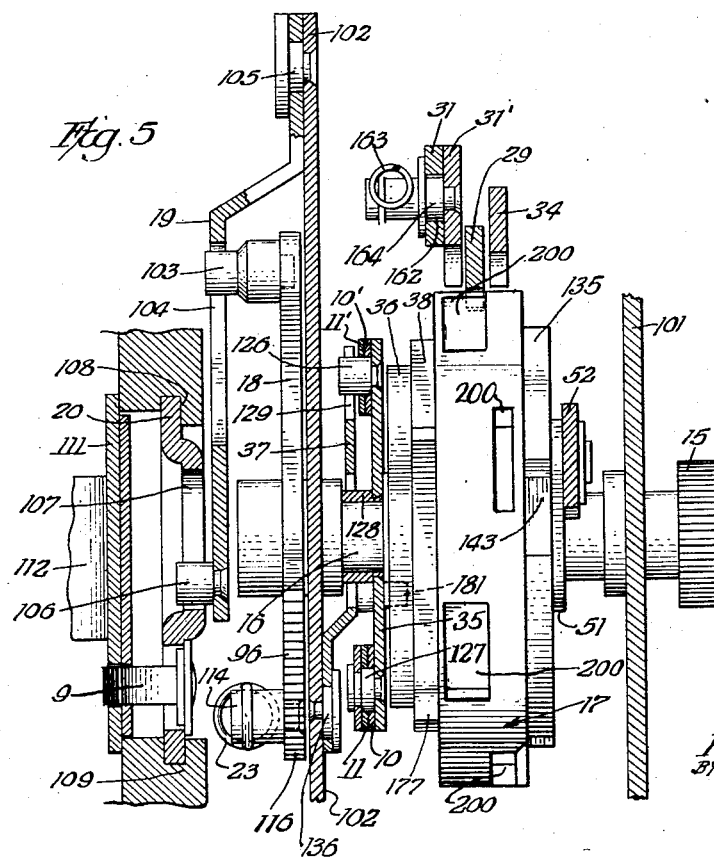
Fig. 5 is a vertical sectional view and partly elevation through the shutter assembly and elements illustrated in Fig. 4.

Slide 20 is provided adjacent one end thereof with a pawl 9, which has a straight operative face, Fig. 1, and is rounded at the opposite side. This pawl, furthermore, is resiliently supported on the slide 20 in such manner that upon movement of the slide plate and pawl in one direction, as for instance, to the right in Fig. 1, the pawl entering a perforation on the film 4 will push the film along over the entire distance of the stroke of the slide 20, while upon return movement of the slide 20 to the left, the pawl 9 will yield and will slip with its rounded face over the film, without exerting any pushing or dragging effect upon the film. The nose of the pawl 9 projects into a horizontal slot of the pressure plate 111, as indicated in Figs. 2 and 5.

In order to assure uniform movement of the slide 20, and hence also uniform feeding movement of the film, the crank arm 18 is provided, as shown in Fig. 4, with a sector 96 having teeth 116 at its outer edge, the tooth portion of the sector terminating in a notch 117. A pawl 21 is secured to the rear plate 102 of the frame on a pivot pin 95 and is controlled by a weak spring 97. Upon rotation of the sector in clockwise direction, Fig. 4, the sector will strike the pawl 21 to turn it about its pivot 95 in anti-clockwise direction, so that the nose of said pawl enters between the teeth of the sector 96 and prevents the return movement thereof. Solely when the notch 117 is in opposition to the pawl 21, the pawl will again be returned by the spring 97 to the position shown in Fig. 4, and only then return movement of the sector 96 to the position shown in said figure is made possible. This return movement of the crank arm 18 and sector 96 to the position shown in Fig. 4 is induced by the relatively strong spring 23 which is anchored on the rear plate 102 at the pin 115 and is also anchored to the sector 96 at the pin 114.

It is obvious, therefore, that with each manipulation of the lever 12, the lever and thereby also the crank arm 18 must be moved through a uniform angle before it can be returned again to the original position.

The same movement of the manipulating lever 12 also is utilized for tensioning the shutter mechanism of the camera. The shutter mechanism comprises two pairs of blades 10, 11 and 10', 11' respectively, to be described below. The shutter actuation is effected by a spring motor 17, and the uniform tensioning of the spring motor is effected by the manipulating lever 12 in the following way:

Shaft 16, actuated upon manipulation of the lever 12 through the gears 14, 15, carries between plates 101, 102 loosely the hub 138 of a spring drum 135 having an outer cylindrical flange to which the outer end of the spring 140 is fixedly secured. The inner end of the spring 140 is secured to the hub 137 of the drum 145 which loosely surrounds the drum 135. The drums 135, 145, therefore, constitute the housing of the spring motor 17.

Figure 3:
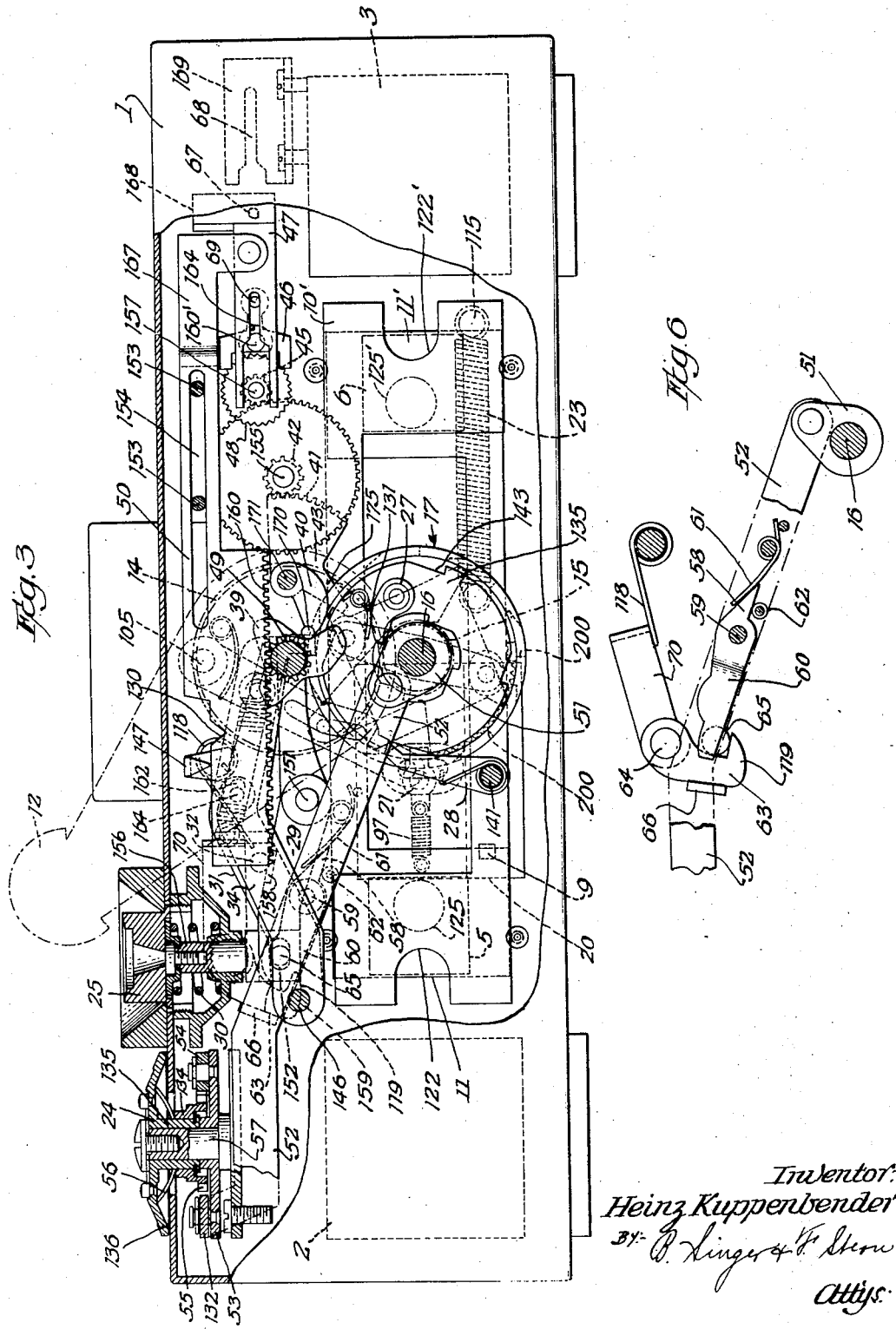
Fig. 3 is a vertical sectional view through the apparatus.

The closure plate 139 of the inner drum 135 carries a pawl 27 pivotally mounted thereon and adapted under action of a spring 131 to engage a ratchet 26, Fig. 3, which is fixed relatively to the shaft 16.

Upon manipulation of the lever 12, rotation will be imparted through the gears 14, 15 to the shaft 16 and the ratchet 26, whereby owing to the pawl 27 the drum 135 is rotated, so that the spring 140 is tensioned, provided the other end of the spring is held against movement. Return rotation of the spring drum 135 is prevented owing to the provision of a holding pawl 28 which is pivotally secured to a pin 141 on the front frame plate 101 and is urged by a spring 144 to engage ratchet teeth 143 cut into a cylindrical flange of the inner drum, so that the latter can be rotated clockwise only, Fig. 3.

The shutter blades 10, 11, 10', 11' are arranged in pairs, and in the following, the left hand pair of blades 10, 11, Fig. 4, is described with the understanding that the right hand pair 10', 11' has identical parts indicated by corresponding index reference characters.

The blade 10 comprises an elongated arm 120 and a head 121 extending at right angle thereto. The head 121 is provided midway between its upper and lower edge with a notch 122 having a semi-circular inner portion and opening in the outer edge of head 121. Here its width is equal to the diameter of the semi-circular part. The blade 11 also is provided with an elongated arm 123 and with a head 124. The blades 10, 11 are disposed with the heads 121, 124 overlapping each other and in frictional engagement, while the arms are almost in the same plane. The head 124 of the blade 11 is provided with a circular opening 125. From Fig. 4, it will be seen that the overlapping area of the heads 121, 124 is large enough to obstruct the passage of light to the exposure window 5, the head 124 blocking the light through the inner part of the notch, while the head 121 blocks the circular aperture 125.

Upon movement of the blade 10 to the right and blade 11 to the left, the semi-circular edge of the notch 122 may register with the right hand part of the circular opening 125, whose left hand part is then free of obstruction, so that the light from the lens in the mounting 7 may reach the film through the opening 25 and window 5.

The blades 10', 11' are similarly constructed and similarly movable simultaneously in opposite directions. Rectilinear movement of the blades may be assured by guide pins projecting from the rear plate 102 against the upper and lower edges of these blades (not shown).

A lever 35 is riveted to a bushing 128, Fig. 5, loosely supported by the shaft 16 to the rear of the spring motor 17. This lever is provided adjacent opposite ends with pins 126, 127 for the pivotal attachment of the shutter blades thereto, the upper pin holding the arms 123, 120', and the lower pin 127 serving for the attachment of the arms 120, 123'. Means may be provided (not shown) for permanently retaining the blades of each pair in close superimposition at the overlapping portions.

A rocker 37 which is pivotally secured near its lower end at 136 to the rear frame plate 102 engages near its upper end the pin 126 of lever 35 by means of a bifurcated portion 129.

The spring motor 17 is released to operate the shutter in the following way: A shutter actuating button 25 mounted on top of the camera controls a post 156 which normally is pressed upward by a helical spring 30 surrounding the post, as known from similar shutter releases. The lower end of post 156 is provided with a laterally projecting pin 65 entering a slot 152 at the rear end of a lever 29. This lever is pivoted intermediate its ends on a post 151 projecting from the rear frame plate 102, whereby a nose at the front end of the lever 29 is normally constrained into one of a series of suitable openings 200 circumferentially spaced on the flange of the outer spring drum 145. The spring 30, urging the rear end of the lever 29 upwardly will hold the nose of the lever in engagement with a radial wall of the respective notch 200. Upon release of the nose from the notch, spring 140 immediately will impart rapid rotation to the drum 145, until it is stopped.

The means for limiting the rotation of the drum 145 are formed by a lever assembly 31, 31', of which lever 31 is pivoted at 159 adjacent its rear end to the frame plate 102. A tongue 158 projecting laterally from the lever 29 underlies a pin 32 projecting from the lever section 31, whereby normally this arm 31 is held slightly raised. The lever 31 has an offset at 165, and lever 31' is longitudinally slidable with respect to the lever 31, the latter being provided with slots 162 into which pins riveted to lever 31' project. The slidable lever 31' terminates in a hook which, therefore, is normally slightly raised from the circumference of the drum 145. A spring 163 anchored at the offset part 165 of lever 31 and connected with a pin on lever 31' permits a sliding movement of lever 31', whereby the impact of a notch against the nose of lever 31' is resiliently absorbed. The openings 200 are in axial direction dimensioned to permit the nose of the lever 29 as well as the nose of the lever 31' to enter therein; the notches or openings intended for engagement by the nose of the lever 34, however, are circumferentially offset with respect to the openings 200 intended for the hooks of the levers 29 and 31'.

Depending upon the selected exposure time, the unwinding of spring 140 will be continued with greater or smaller velocity, and the stoppage of the spring motor 17 will be effected through the entry of the nose of lever 31' into one of the notches 200 of the drum 145.

The selection of the exposure time or setting of the shutter speed is effected from a knob 13 which is rotatably mounted on the front wall of the casing and which in a known way brings a pointer or index into selective association with speed indications on a dial, an arrangement which is well understood in this art.

The knob 13 here shown in coaxial relation to the manipulating lever 12 is fixedly connected with a cam 39 inwardly of the front frame plate 101. This cam, as shown in Fig. 3, provided with several projecting lobes, is held in engagement with a pin 170 formed on a lever 40 which is fixed on a shaft 171 supported in the frame plates 101, 102. The shaft 171 also supports in fixed relation to cam lever 40 another cam lever 43, Fig. 3, which carries a gear sector 41 and also is provided with a single projecting tooth 175.

It is evident, therefore, that upon rotation of the knob 13, the cam 39 is imparted a selectively defined position and that the arm 40 urged continuously against the cam 39 by spring 172 also is adjusted thereby, transmitting the adjustment to the lever 43 and the tooth 175 thereof.

The rear wall of the outer spring drum 145 is united by rivets or the like, as shown in Figs. 2 and 5, with a ratchet plate 38. This ratchet plate is of substantially square shape and has at each corner a projecting tooth 177 located in the plane of the tooth 175 of the sector lever 43. While, therefore, upon setting of the knob 10 13 a partial rotation may be imparted to the cam 39 to be frictionally transmitted to the lever 40, the shaft 173 and the sector lever 43, the drum of the spring motor 17 cannot be rotated until the locking lever 29 is moved to release position by the actuation of the shutter release button 25. The stopping tooth 175 will, therefore, be given a setting at a certain distance from the next adjacent tooth 177 of the ratchet stop plate 38 which is united with the drum 145.

A cam plate 36 also is riveted or otherwise united with the bottom of the spring drum 145, and this cam plate 36 controls the movement of the rocker 37 through which the shutter operating lever 35 and hence the shutter blades are actuated. As will be seen from Fig. 4, the rocker 37 is provided at two approximately diagonal points with pins 181, 182 which engage the edge of the cam plate 36, whereby this rocker is forcibly rocked back and forth about its lower pivotal support on the rear frame plate 102. It is obvious that the movement imparted by the bifurcation 129 of the rocker to the lever 35 will swing this lever about the axis of the shaft 16 forth and back to a sufficient extent to bring the heads of the shutter blades 10, 11 and 10', 11', respectively, into such relation that the light will pass through the temporarily unobstructed openings 125 and affect the film to the rear of the windows 5, 6 and will then again cause the heads of the blades 10, 11 and 10', 11' to overlap to such extent that they will obstruct said passage of light.

The shutter speed setting knob 13 also is united with a pinion 49 in engagement with a rack 160 at the lower edge of a rack bar 50 which, as shown in Fig. 3, is guided for rectilinear movement by pins 153 secured to the rear frame plate 102 and projecting through a straight slot 154 in the extended portion of the rack bar. Each setting of the exposure adjusting knob 13, therefore, also will induce a longitudinal displacement of the rack bar 50. The gear sector of the lever 43 is in engagement with a pinion 42 loosely mounted on a post 155 projecting from the rear frame plate 102, and this pinion is united with a spur gear 44 in engagement with another pinion 45 mounted on another post 157 likewise projecting from the rear plate 102. The pinion 45 is fixed to an escapement wheel 48, and while, therefore, the strong spring acting on lever 43 normally has a tendency to rock the lever back to initial position, this rocking movement will be controlled through the escapement mechanism just described.

The anchor 46 of the escapement mechanism is mounted for rocking movement on a pin 160' secured to a bracket 161 which is fixed to the rear frame plate, as shown in Fig. 3. The head of the escapement anchor 46 also carries a pin 69 projecting into a slot 164 of a secondary escapement anchor 47. The latter is pivotally mounted at 166 on a pin projecting from an extension 167 of the rack bar 50, and the secondary anchor 47 also is provided with an extension 168 having a pin 67 by means of which said secondary anchor 47 may enter a guide slot 68 in a bracket 169 suitably secured to a part of the camera housing.

The rack bar 50 is provided at the edge opposite the toothed edge with a notch 130 for cooperation with a lever 34; this lever 34 is pivotally mounted at 146 at the front frame plate 101 and is similar to the lever 31 so that normally the nose of said lever 34 also is raised a slight distance from the circumference of the drum 145. The lever 34 also is provided with a lateral projection 147 adapted to overlie the upper edge of the rack bar 50, but when this rack bar through the actuation of the pinion 49 has been displaced a certain distance, the lateral projection 147 terminating in a sharp point will drop into the notch 130 of the rack bar.

As in other cameras, the present camera also is provided with means for indicating the number of exposures made. An exposure counter is mounted at 24 on the top of the camera for actuation with each winding movement of the spring motor. The ratchet 26 pinned to the shaft 16 is here shown to be firmly connected with a crank arm 51 to the outer end of which a link 52 is pivotally secured. This link extends angularly upwardly and is provided at the end with a laterally deflected portion 132. It is secured at this portion to a ring disc 53 which is rotatable about the post 57 of the exposure counter 24. The ring disc 53 serves as carrier for a pawl 54, the free end of which is spring pressed against a tooth of a ratchet 55 at the lower end of a bushing 134 surrounding a sleeve 135 which is integral with the disc 136 of the exposure counter 24. A frictional connection is interposed between the bushing and the sleeve whereby upon each rotary step imparted to the ratchet 55, a similar rotary step is imparted to the disc 136. The latter may be provided with markings traveling past a fixed indicator mark, not shown, on the top of the camera to permit the reading of the exposures made. A spring 56 serves for preventing return movement of the bushing 134 and for retaining the frictional clutch engagement between said bushing and the counter disc.

Means are, furthermore, provided for preventing the accidental double or multiple exposure on the same film area necessitating the feeding operation on the film to be carried out before the shutter release button again can be actuated. A lever 60 is pivotally mounted on the link 52 by means of the pivot pin 59. This lever has a projecting nose 58 which is forced into engagement with a pin 62 on the link 52 by means of a spring 61 engaging at its free end the top of the nose 58. The lever 60 is offset between its free end and its pivot pin 59, as indicated in Fig. 1, and the free end portion of the lever engages a lateral projection 66 of another lever 63 which is pivotally secured at 64 to the rear frame plate. This lever 63 is united by the pivot pin 64 projecting through the rear frame plate with a lever 70 having a deflected portion constrained by a relatively strong spring 118 to a predetermined angular position to the rear of said frame plate. Owing to the fixed connection of the lever 70 with the lever 63, the latter also is constrained to move in counterclockwise direction as seen in Fig. 3, whereby the lateral tongue 66 of the lever is forced against the free edge of the lever 60.

When, however, through the movement of the link 52, the abutment pin 62 has been withdrawn from the nose of the lever 60, the latter is rocked in clockwise direction about its pivot 59, thereby withdrawing its rear end from the lateral tongue of the lever 66, and this lever then under the influence of the spring 118 is rocked counterclockwise, engaging by means of its hook 119 underneath the projecting pin of the post for the shutter release button 25 and preventing thereby the repeated operation of the shutter release button before an advance of the film has been effected.

Upon turning the shutter speed setting button 13, the operator also rotates the lever 43, thereby controlling the extent to which the escapement mechanism enters into operation when the shutter is released.

Upon release of the shutter by depression of the shutter release button 25, the lever 29 is moved out of a holding notch provided in the plane of movement of the lever 29 on the circumference of the drum 145. The spring motor 17, therefore, begins to operate, the disc 38 engages by means of a tooth on one of its corners the tooth 43 of the sector lever 41 turning thereby said sector, to the angular extent determined by the adjustment of the cam 39. The escapement comprising the escapement wheel 48 and escapement anchor 46 is actuated through the train of gears 42, 44, 45, and in this manner the speed at which the spring motor is unwound and at which the shutter blades 10, 11 and 10', 11' respectively are actuated is determined. The escapement will have a retarding influence upon the movement of the shutter, and eventually the secondary escapement 47 may be employed for this purpose.

Upon rotation of the shutter speed setting button 13, the pinion 49 connected therewith also will actuate the rack bar 50, which rack bar is connected with the additional escapement anchor 47. The extent of movement of the rack bar 50 is determined by the distance between the projection on the lever 34 and the notch on the rack bar.

The spring drum 145 also is provided with a series of circumferential notches in the plane of movement of the lever 31. Owing to the downward movement of the lever 29 induced by the shutter button 25, the lever 31 is released from its raised position and drops into the next succeeding notch in its plane of movement on the spring drum 145. Hence, in snapshot exposures, the movement of the drum is determined by the circumferential spacing of the notch from which the lever 29 is released to the notch into which the lever 31 is caused to enter under the action of the strong spring on said lever. When then the shutter button 25 is released subsequent to the movement of the spring motor, the holding lever 29 again returns into another notch on the circumference of the spring drum in that series of notches which is located in the plane of the lever 29.

For taking time exposures in which the lens remains uncovered for a period during which the shutter button 25 remains depressed, the third of the levers, namely, the lever 35 is utilized. Upon setting the timing knob 13 for time exposures, the rack bar 50 is adjusted to bring the notch thereon into opposition to the projection on the lever 34. When then the shutter button 25 is depressed, the lever 34 has already been lowered owing to the entry into the notch of the rack bar into one of the notches on the circumference of the spring drum. Hence, in time exposures, the spring drum upon opening the shutter, moves from the notch in which the lever 29 entered to a notch in which the lever 34 entered. Upon release of the shutter button 25 in time exposures, the spring drum 145 then continues until again a notch for the holding lever 29 is in position to be entered by said holding lever, so that the parts again are in the original position.

I claim:

1. In a stereoscopic camera, the combination of a camera housing, a pair of spaced lens mountings, a pair of shutters for the lenses of said mountings, rotary means disposed between said lens mountings for setting the shutters selectively both to the same speed, and means coaxial with said shutter setting means for tensioning the shutters uniformly.

2. In a stereoscopic camera, the combination of a camera housing, a pair of spaced lens mountings, a pair of shutters for the lenses of said mountings, rotary means disposed between said lens mountings for setting the shutters selectively both to the same speed, means coaxial with said shutter setting means for tensioning the shutters uniformly, and means coaxial with said rotary shutter setting means for tensioning the shutters and for transporting the film.

3. In a stereoscopic camera, the combination of a camera housing, a pair of spaced lens mountings, a pair of shutters for the lenses of said mountings, rotary means disposed between said lens mountings for setting the shutters selectively both to the same speed, means coaxial with said shutter setting means for tensioning the shutters uniformly, a single spring between said lens mountings in the housing, means coaxial with the shutter setting means for tensioning the spring, and means for transmitting the untensioning movement of said spring to both shutters.

4. In a stereoscopic camera, the combination of a camera housing, a pair of spaced lens mountings, a pair of shutters for the lenses in said mountings, each shutter comprising a pair of blades which are movable relatively to each other, a spring between said lens mountings in the housing, means for tensioning said spring and means for transmitting the untensioning movement of said spring to both blades of each pair simultaneously for moving the blades of each pair relatively to each other.

5. In a stereoscopic camera, the combination of a camera housing, a pair of spaced lens mountings, a pair of shutters for the lenses in said mountings, each shutter comprising a pair of blades which are movable rectilinearly only relatively to each other, a spring between said lens mountings in the housing, means for tensioning said spring and means for transmitting the untensioning movement of said spring to both blades of each pair simultaneously for moving the blades of each pair relatively to each other.

6. In a stereoscopic camera, the combination of a camera housing, a pair of spaced lens mountings, a pair of shutters for the lenses in said mountings, each shutter comprising a pair of blades which are movable rectilinearly only relatively to each other, a single spiral spring tensionable about a rotary axis, and means for converting the rotary untensioning movement of said spring into a back and forth rectilinear movement of each blade of each pair of the shutters.

7. In a stereoscopic camera, the combination of a camera housing, a pair of spaced lens mountings, a pair of shutters for the lenses in said mountings, each shutter comprising a pair of blades which are movable relatively to each other, rotary means disposed between said lens mountings for setting the shutters selectively both to the same speed, a spring motor within the housing having an axis parallel to that of the rotary shutter setting means, means coaxial with the shutter setting means for tensioning the spring motor and simultaneously transporting the film, and means operable in a path independent from said axes for releasing the tension of the spring of said motor.

8. In a stereoscopic camera, the combination of a camera housing, a pair of spaced lens mountings, a pair of shutters for the lenses in said mountings, separate means operable about a common axis for setting the shutters to a selected speed and for tensioning the shutters, and means operable in a rectilinear path for simultaneously tripping the shutters, said last named means being mounted outside the path of movement of said shutter tensioning means.

9. In a stereoscopic camera, the combination of a camera housing, a pair of spaced lens mountings, a pair of shutters for the lenses in said mountings, means for selectively setting the shutters to the same speed, means for uniformly tensioning the shutters, and means for simultaneously tripping the shutters, the shutters comprising each a pair of blades, the blades of each pair being guided for rectilinear movement and being movable upon tripping of the shutter in opposite directions to each other, each blade comprising an arm connected with the shutter tripping means and a head, the blades of each pair being one directly behind the other, the head of one blade of each pair having an opening and the head of the other blade of each pair having a notch of a size determined by the opening in the other blade, said notch and opening in the two blades being arranged in such manner that upon movement of the blades in opposite directions, the notch and opening will enter into registration with each other, and upon return movement will move out of registration.

10. In a stereoscopic camera, the combination of a camera housing, a pair of spaced lens mountings, a pair of shutters for the lenses in said mountings, rotary means disposed between said lens mountings for selectively setting the shutters to the same speed, means coaxial with said shutter setting means for tensioning the shutters uniformly, a rotary spring housing operatively connected with said shutters, shutter release means, and means for holding the spring housing connected with the shutters against movement during operation of the shutter tensioning means and for holding the spring housing connected with the shutter tensioning means against movement during a release of the shutters.

11. In a stereoscopic camera, the combination of a camera housing, a pair of spaced lens mountings, a pair of shutters for the lenses in said mountings, a rotary means disposed between said lens mountings for selectively setting the shutters both to the same speed, means coaxial with said shutter setting means for uniformly tensioning the shutters, a single rotary spring within the housing and adapted to be tensioned by said shutter tensioning means, a rotary carrier for said spring, means connected with said rotary carrier for simultaneously actuating the shutters upon release of the tension spring, and another element carried by said rotary spring for determining the extent of release of said spring.

12. In a stereoscopic camera, the combination of a camera housing, a pair of spaced lens mountings, a pair of shutters for the lenses in said mountings, means for selectively setting the shutters to the same speed, means for tensioning the shutters, and means for releasing the tension shutters, the tension shutter and release means comprising a spiral spring, a carrier for said spring connected with one end of the spiral and adapted to be actuated upon movement of the shutter tensioning means, a rotary carrier for the other end of said spring and adapted to be actuated upon operation of the shutter release means, a rocker to which the shutters are connected, a cam on said last named spring carrier for actuating the rocker, and means also on said last named spring carrier for stopping the untensioning movement of said spring upon said element having traveled through a path determined by the setting of the shutter setting means.

13. In a stereoscopic camera, the combination of a camera housing, a pair of spaced lens mountings, a pair of shutters for the lenses in said mountings, rotary means disposed between said lens mountings for selectively setting the shutters both to the same speed, means coaxial with said shutter setting means for uniformly tensioning the shutters, a spring motor having an axis parallel to the axis of the shutter setting and tensioning means, and means movable about the axis of the spring motor and controlled by said shutter tensioning means for imparting rectilinear movement to the film in the camera.

14. In a stereoscopic camera, the combination of a camera housing, a pair of spaced lens mountings, shutters for the lenses in said mountings, rotary means for selectively setting the shutters both to the same speed, and rotary means coaxial with said first named means for uniformly tensioning the shutters and for advancing the film by exerting a pushing action on a straight portion of the film.

15. In a stereoscopic camera, the combination of a camera housing, a pair of spaced lens mountings, a pair of shutters, rotary means disposed between said lens mountings for selectively setting the shutters, rotary means coaxial with said shutter setting means for uniformly tensioning the shutters, a film pushing means movable in a rectilinear path between the lens mountings, said last named rectilinearly movable film transporting means being controlled by said rotary shutter tensioning means.

16. In a stereoscopic camera, the combination of a housing, a pair of spaced lens mountings, the film being movable in a plane to the rear of said lens mountings, shutters for the lenses in the mountings, rotary means for setting the shutters to selected speeds, rotary means coaxial with said first named means for tensioning the shutters, a slide plate, means interposed between said second means and said slide plate for imparting a rectilinear movement successively in opposite directions to said slide plate upon actuation of said shutter tensioning means, and a member on said slide plate in permanent engagement with the film and adapted to move the film rectilinearly upon movement of said slide plate in one direction.

17. In a stereoscopic camera, the combination of a housing, a pair of spaced lens mountings, a single shutter tensioning means operable rotatably between said lens mountings from the front of the housing, film guiding means in the interior of the housing, and means actuated by said rotary shutter tensioning means for pushing the film when said rotary tensioning means is actuated in one direction, and for ineffectively engaging the film when said rotary shutter tensioning means is actuated in the opposite direction.

18. In a stereoscopic camera, the combination of a camera housing, a pair of lens mountings, a single rotary tensioning means for the shutters of the camera, a film guide in the interior of the housing, a reciprocable member in the interior of the housing, a plurality of elements interposed between the rotary shutter tensioning means and the reciprocable film guide for converting the rotary movement of said tensioning means into reciprocating movement of the film guide, a pawl on said film guide adapted to enter a sprocket hole of the film when said guide is moved in one direction, and adapted to ride over the film without entering the sprocket holes of the film when the guide is moved in the opposite direction.

HEINZ KÜPPENBENDER.